United States Patent Office 3,789,033
Patented Jan. 29, 1974

3,789,033
POLYURETHANES BASED ON ARYLOXY-CARBONYL ISOCYANATES
Hermann Hagemann and Josef Pedain, both % Farbenfabriken Bayer Aktiengesellschaft, Leverkusen, Germany, and Erich Zankl, deceased, late of Cologne, Germany, by Helga Zankl and Walter Zankl, both of Amsterdamer Strasse 76, Cologne, Germany, and Angelika Zankl de Ramis, c/de las Parelladas, Palma de Mallorca, Spain, heirs
No Drawing. Filed Sept. 22, 1971, Ser. No. 182,902
Claims priority, application Germany, Oct. 3, 1970, P 20 48 658.2
Int. Cl. C08g 22/32, 51/26
U.S. Cl. 260—77.5 TB  10 Claims

ABSTRACT OF THE DISCLOSURE

Masked oxycarbonylisocyanates are prepared by reacting aryl oxycarbonylisocyanates with a compound containing at least two hydroxyl groups. When NCO and OH are present in equivalent amounts, the compounds are suitable as reactants with polymers containing hydroxyl groups for the production of, for example, lacquers. When the reaction is carried out such that OH groups are present in excess of that required to react with the available —NCO, the compounds, which are self cross-linking, are suitable for the production of, for example, cross-linked synthetic resins.

---

This invention relates to masked oxycarbonylisocyanates, a method for their preparation and more particularly to masked oxycarbonylisocyanates containing iminodicarboxylic acid monoarylester groups.

It is well known in the art that isocyanates can be rendered nonreactive at ordinary temperatures by masking or blocking the isocyanates with phenol. Heating to an elevated temperature "unblocks" the isocyanates, thus rendering it reactive. This phenomenon is employed in polyisocyanate systems wherein cross-linking is undesirable except at elevated temperatures. The masked isocyanates are generally prepared by reacting free isocyanates with phenol, however, difficulties are encountered in masking isocyanates which contain more than two isocyanate groups in the molecule. Moreover, the commonly known phenol masked polyisocyanates are generally not crystalline or have relatively low melting points and as a result they are not suitable for use as for example, cross-linking agents for lacquer powders. Phenol blocked aromatic isocyanates have the additional disadvantage of being very sensitive to light.

It is therefore an object of this invention to provide a process for the preparation of masked isocyanates devoid of the foregoing disadvantages. It is a further object of this invention to provide a process for the preparation of masked oxycarbonylisocyanates. It is another object of this invention to provide oxycarbonylisocyanates containing iminodicarboxylic acid monoarylester groups. Yet a further object of this invention is to provide oxycarbonylisocyanates containing both iminodicarboxylic acid monoarylester groups and free hydroxyl groups. Still another object of this invention is to provide self-cross linking masked isocyanates which contain iminodicarboxylic acid monoarylester groups and free hydroxyl groups.

The foregoing objects and others which will become apparent from the following description are accomplished in accordance with the invention, generally speaking, by reacting organic compounds containing hydroxyl groups with an aryloxycarbonylisocyanate. More particularly, masked oxycarbonylisocyanates are prepared by reacting an organic compound containing at least two hydroxyl groups with an aryloxycarbonylisocyanate having the general formula

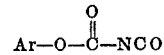

wherein Ar is a substituted or unsubstituted aryl radical containing from 6 to 14 carbon atoms, such that the OH/NCO ratio is at least one.

In the process according to the invention, the reaction between the hydroxyl containing compound, $R(OH)_n$, wherein R is an n-valent organic radical and $n$ is at least two and an aryloxycarbonylisocyanate proceeds in accordance with the following equation

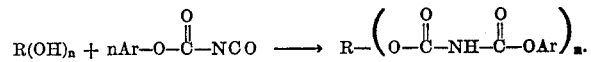

The corresponding phenol is split off by heat, the free polyoxycarbonylisocyanate being formed in accordance with the following equation

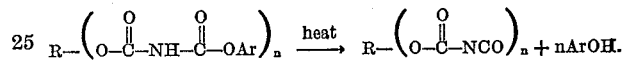

The compound which contains hydroxyl groups may be reacted with either an equivalent or subequivalent quantity of aryloxycarbonylisocyanate. When equivalent quantities are used, i.e. the NCO/OH ratio is about one, compounds containing iminodicarboxylic acid monoarylester groups are prepared which are suitable for further reaction with hydroxyl containing polymers. When subequivalent quantities are used, i.e. the NCO/OH ratio is less than one, self-cross linking compounds containing both iminodicarboxylic acid monoarylester groups and free hydroxyl groups are prepared and are suitable for the production of cross-linked synthetic resins, foils, films and coatings.

According to a particular embodiment of the process of the invention, the compounds which contain hydroxyl groups are not reacted with aryloxycarbonylisocyanate but with the reaction product of an aroxycarbonylisocyanate and a phenol. This reaction product may be regarded as a potential aroxycarbonylisocyanate since it can easily be converted into an aryloxycarbonylisocyanate by heating to remove the phenol.

Aryloxycarbonylisocyanates suitable for use in the process according to the invention can easily be obtained by reacting phenols with N-chlorocarbonylisocyanate according to the procedure described for example in Belgian patent specification 736,853 which corresponds to U.S. Pat. 3,706,778.

The preferred aryloxycarbonylisocyanate for the process according to the invention is phenoxycarbonylisocyanate although any other aryloxycarbonylisocyanates may, of course, be used for the process according to the invention, especially those which can be prepared by reacting optionally substituted phenols which contain 6 to 14 carbon atoms with N-chlorocarbonylisocyanate. Examples of these are reaction products of N-chlorocarbonylisocyanate with phenols, such as, for example, pentachlorophenol, cresols, naphthols, anthranols and the like.

Any compounds which contain at least two hydroxyl groups are suitable for reaction with the aryloxycarbonylisocyanates.

Low molecular weight divalent to hexavalent alcohols are of particular interest. Some examples of these are ethylene glycol, propylene glycol, butane-1,3-diol, butane-1,4-diol, hexamethylenediol, diethylene-glycol, tripropylene glycol, xylylene glycol, glycerol, trimethylolpropane, pentaerythritol, mannitol and the like.

These low molecular weight divalent to hexavalent alcohols are advantageously reacted with the aroxycarbonylisocyanates in such proportions that at least one NCO group is available for each hydroxyl group. The difunctional to hexafunctional oxycarbonylisocyanates masked with phenol which can be obtained by this method generally have molecular weights below about 1000. These compounds are especially suitable for use as cross-linking agents for high molecular weight compounds which contain hydroxyl groups.

The process according to the invention is, however, also suitable for introducing iminodicarboxylic acid monoarylester groups into higher molecular weight compounds which contain hydroxyl groups, higher molecular weight compounds being understood to mean compounds which can be converted into polyisocyanates masked with phenol having a molecular weight above 100 by modification with aryloxycarbonylisocyanate. Particularly suitable examples of such hydroxyl compounds for use in the process of the invention are hydroxyl polyesters, hydroxylpolyethers, hydroxylpolyacetals, hydroxylpolyurethanes and hydroxylpolyureas, hydroxylpolyepoxide resins and hydroxyl polymerization products, especially acrylate resins and the like.

Suitable polyesters are, for example, those obtained from polycarboxylic acids such as adipic acid, succinic acid, maleic acid, phthalic acid, isophthalic acid, terephthalic acid, hexahydrophthalic acid, hexachloroendomethylene tetrahydrophthalic acid, trimellitic acid and pyromellitic acid with excess polyalcohols such as ethylene glycol, propylene glycol, butane-1,3-diol, butane-1,4-diol, hexanediols, diethylene glycol-tripropylene glycol, xylylene glycol, glycerol, trimethylolpropane, pentaerythritol, mannitol and their hydroxyalkylation products; polyesters of hydroxypivalic acid, thioglycollic acid, hydroxydecanoic acid, caprolactone and propiolactone; polycarbonates obtained from polyphenols or polyalcohols by condensation reactions with phosgene or dialkylcarbonates or diarylcarbonates; also, polyesters which are modified with fatty acids and polyesters which contain amide groups as a result of the incorporation of amino alcohols.

Suitable polyethers are, for example, products obtained from polyols such as ethylene glycol, propylene glycol, butane-1,3-diol, butane-1,4-diol, hexanediols, glycerol, trimethylol propane, pentaerythritol, mannitol or sorbitol and alkylene oxides such as ethylene oxide, propylene oxide and butylene oxide, epichlorohydrin and the bis-2,3-epoxypropylether of diphenylolpropane, or polyethers based on trimethylene oxide or tetrahydrofuran and the like.

The following are mentioned as further examples of polyaddition and polycondensation products which are suitable for the reaction according to the invention with aryloxycarbonylisocyanate: Polyacetals of formaldehyde and diols, naturally occurring polyacetals such as, for example, starch, dextrin, cellulose and their acylation and degradation products; polyurethanes, for example, those obtained from low molecular weight polyols such as ethylene glycol, propylene glycol, butanediols, hexanediols, di- and triethyleneglycol, thiodiglycol, di-($\beta$-hydroxyethyl) adipate, glycerol, trimethylolpropane, mannitol or glucose by their polyaddition with polyisocyanates such as hexamethylene diisocyanate, tolylene diisocyanate, 4,4'-diisocyanatodiphenylmethane, 1,5-naphthylene diisocyanate or 4,4',4''-triphenylmethane triisocyanate and the like. Polyureas, for example, those obtained from diamines such as hexamethylenediamine and polyisocyanates such as hexamethylene diisocyanate or tolylene diisocyanate with the incorporation of amino alcohols into the macromolecule. Polyepoxide resins are also suitable, such as, for example, the resins based on the bis-(2,3-epoxypropyl) ether of diphenylolpropane or butanediol which contain secondary hydroxyl groups.

Suitable polymerization products for the process according to the invention are especially those polymers in the preparation of which about 0.5 percent by weight of co-monomers which cnotain hydroxyl groups have been include.

Some suitable polymerization products are, for example, homo- and copolymers of acrylic acid, methacrylic acid, crotonic acid, maleic acid, cinnamic acid, $\beta$-hydroxyethylacrylate and propylacrylate, $\beta$-hydroxyethylmethacrylate and propylmethacrylate, 6-hydroxyhexylmethacrylate, allyl alcohol, 2-hydroxyethylmaleate, di-2-hydroxyethylmaleate, 5-methylolbicyclo-2,2,1-heptene, N-hydroxyethylmethacrylamide, methacrylic acid-N-di-($\beta$-hydroxyethyl) amide and the like.

Copolymers of these monomers with other polymerizable compounds are also suitable, such as, for example, copolymers with methyl acrylate, ethyl acrylate, butyl acrylate, methylmethacrylate, ethyl methacrylate, butylmethacrylate, hexylmethacrylate, styrene, vinyl acetate, vinyl chloride, vinylidene chloride, vinyl butylether, N-vinylpyrrolidone, N - vinylureas or N - vinylurethanes, acrylonitrile, ethylene, propylene butadiene, isoprene, chloroprene and the like.

Furthermore, polymers in which hydroxyl or carboxyl groups have been introduced subsequently by grafting reactions or by hydrolysis may be used as starting materials, some of which are for example: polyvinyl alcohol, partly saponified polyvinyl acetate, partly saponified copolymer of polyvinyl acetate and polyethylene, partly saponified polyacrylic esters, partly saponified polyvinylidenecarbonates, and graft polymers such as vinyl compounds on linear or branched polyethers. The starting materials used for preparing the products of the process may be branched or linear in structure and have a molecular weight of up to about 5,000,000.

The reaction according to the invention of the compounds which contain hydroxyl groups with aryloxycarbonylisocyanate may be carried out with the reactants used in a ratio corresponding to an OH/NCO ratio of about 1 in which case all the hydroxyl groups are converted into iminodicarboxylic acid monoarylester groups. The compounds obtained in this manner may be used, for example, together with unmodified polymers which contain hydroxyl groups, as heat hardening systems, for example, in the production of stoving lacquers.

Alternatively, the reaction of the polymers which contain hydroxyl groups with aryloxycarbonylisocyanates may be carried out with reactants used in such proportions that the OH/NCO ratio is greater than 1 and preferably 1.43 to 2.50. The compounds obtained in this manner contain iminodicarboxylic acid monoarylester groups in addition to free hydroxyl groups and consequently may be used in self-cross-linking single component systems, cross-linking being effected simply by heating to "unblock" the isocyanate groups.

The polymers used for the process according to the invention preferably have a hydroxyl group content of from about 1% to 15% by weight based on the weight of polymer. Both those products which have been obtained by complete modifications of the higher molecular weight compounds and those which have been obtained by partial modification generally have molecular weights of over 1000.

The reaction of the aryloxycarbonylisocyanates with the low molecular weight or high molecular weight compounds which contain hydroxyl groups is brought about by simply adding the reactants together at room temperature or even at higher or lower temperatures. A temperature range of from about —50° C. to about 150° C. is suitable, the preferred temperature range being from about 0° C. to about 60° C.

The reaction may be carried out in solvents which are inert to aryloxycarbonylisocyanates, such as, for example, esters such as ethyl acetate or ethyl glycol acetate, hydrocarbons such as toluene or xylene, ketones such as acetone or butanone, chlorinated hydrocarbons such as methylene chloride or chlorobenzene and dialkylated amides such as dimethylformamide. It is of course to be understood that solvents need not be employed, as the reaction can generally be carried out simply by mixing with starting materials. Insoluble high molecular weight products may also be reacted.

The products obtained by the process according to the invention by partial modification are cross-linked simply by heating them to temperatures of about 120° C. or more, high molecular weight substances which have valuable material properties, such as, for example, resistance to chemicals, being produced. Both the low molecular weight products and the high molecular weight products obtained by complete modification may be used in combination with compounds which contain free hydroxyl groups, especially polymers which have free hyhydroxyl groups, for producing systems which can be cross-linked by heating them to temperatures of about 120° C. or more. The reaction temperature and the time required for the cross-linking reaction can be reduced in both cases by the addition of a catalyst. The catalysts may be acids, bases or salts, such as, for example, hydrochloric acid, phosphoric acid, p-toluenesulphonic acid, maleic acid, potassium hydroxide, sodium hydroxide, aluminium trichloride, the morpholine salt of p-toluenesulphonic acid and the like.

The products according to the invention are not only more readily accessible than the known masked polyisocyanates, and especially more so than the conventional polyisocyanates which are masked with phenol, but they also have the special advantage of being obtainable in a crystalline form so that they constitute valuable raw materials in for example, the preparation of binders for lacquer powders. They are also suitable for the production of cross-linked synthetic resin products such as foils, films and coatings by known processes.

The invention is further illustrated but it is not intended that it be limited by the following examples in which all parts are by weight unless otherwise specified.

EXAMPLES

Preparation of diphenylimidodicarboxylate

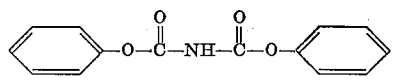

About 21.2 parts (0.2 mol) of N-chlorocarbonylisocyanate are dissolved in about 20 parts by volume of methylene chloride and added dropwise to a solution of about 37.6 parts (0.4 mol) of phenol at from about 20° C. to about 30° C. The solution is kept boiling until evolution of HCl ceases. After removal of the solvent, about 47 parts (91.5% of theory) of colorless crystals having a melting point of from about 122° C. to about 126° C. are obtained.

Preparation of

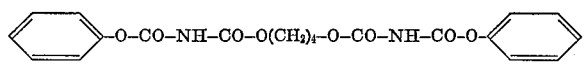

About 18 parts (0.2 mol) of butane-1,4-diol are added dropwise to a solution of about 66 parts (0.4 mol) of phenoxycarbonylisocyanate in about 200 parts by volume of chlorobenzene at about 30° C. After termination of the strongly exothermic reaction, about 100 parts by volume of chlorobenzene are added and the reaction mixture is heated until a clear solution is obtained.

After cooling, suction filtration and washing with petroleum ether, about 76 parts (91.3% of the theory) of colorless crystals having a melting point of about 143° C. are obtained.

Example 1

(a) About 10 parts of

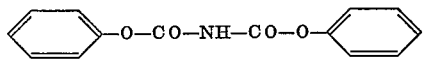

and (b) About 15 parts of

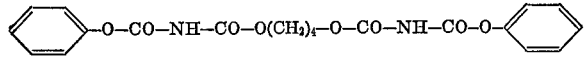

are dissolved in about 100 parts of a 50% solution in ethyl glycol acetate of a polyester of OH number 150 and acid number 3.5 of o-phthalic acid, adipic acid, butane-1,3-diol and trimethylolpropane by mild heating. The solution is painted on aluminium sheets which are then stoved at about 160° C. for about 30 minutes. Cross-linked elastic lacquer films which have a high bond strength and resistance to solvents and chemicals are obtained in both cases.

Example 2

An acrylate resin which is prepared by substance polymerization of about 50% of styrene, about 30% of butylacrylate and about 20% of hydroxypropylmethacrylate without solvent is powdered such that the largest particles have a diameter of about 0.5 mm. About 886 parts of this product, which has an OH number of 74 and a softening point of about 95° C., are introduced into a beaker-shaped stirrer vessel which is provided with a stirrer suitable for keeping the pulverulent substance in constant motion. The vessel is cooled with ice. About 114 parts of phenoxycarbonylisocyanate (NCO/OH ratio=1:1.67) are added dropwise through a dropping funnel at such a rate that the heat of reaction is removed sufficiently rapidly.

A colorless self-cross-linking powder is obtained which is pigmented with titanium dioxide at from about 100° C. to about 110° C. by the common method employing a melt apparatus. It is then sprayed eelctrostatically on cleaned iron sheets. After stoving at about 180° C. for about 3 minutes, lacquer films which have good covering power and excellent leveling flow and gloss are obtained.

Example 3

About 30 parts of phenoxycarbonylisocyanate (NCO/OH ratio 1:1.45) are run into about 200 parts of the 50% solution of the polyester in ethyl glycol acetate prepared in Example 1. After termination of the exothermic reaction, about 1% p-toluene sulphonic acid is added to the solution and the solution is sprayed on degreased carriage panels with a spray gun. After stoving at about 120° C. for about 3 minutes, firmly bonded coatings which are resistant to solvents are obtained.

Example 4

About 750 parts of an epoxide resin having an average molecular weight of about 1000 and which is obtained by condensing 2,2'-bis-p-hydroxyphenylpropane with epichlorohydrin are dissolved in about 250 parts of xylene. The solution, which contains about 2.3% of hydroxy groups, is reacted with about 221 parts of phenoxycarbonylisocyanate at about 20° C. After the addition of about 1% of phosphoric acid, the solution is cast on aluminium sheets which are heated to about 130° C. for about 45 minutes. Elastic coatings are obtained which are resistant to xylene.

For comparison, a modified solution of epoxide resin which has not been treated with phenoxycarbonylisocyanate but only with phosphoric acid is applied to a metal sheet and heated to about 130° C. for about 45 minutes. A hard, brittle layer which is readily soluble in xylene is obtained.

Although the invention has been illustrated in considerable detail by the foregoing examples, it is to be understood that such examples are solely for purposes of

What is claimed is:

1. A self-cross-linking masked isocyanate consisting essentially of the reaction product of an organic compound containing at least two hydroxyl groups with an aryloxycarbonylisocyanate having the general formula

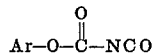

wherein Ar is substituted or unsubstituted aryl radical containing from 6 to 14 carbon atoms, such that the OH/NCO ratio is at least 1.

2. The masked isocyanate of claim 1 wherein the aryloxycarbonylisocyanate is reacted with an equivalent amount of the compound containing at least two hydroxyl groups.

3. The masked isocyanate of claim 1 wherein the aryloxycarbonylisocyanate is reacted with a more than equivalent amount of a compound containing at least two hydroxyl groups.

4. The masked isocyanate of claim 1 wherein the aryloxycarbonylisocyanate is phenoxycarbonylisocyanate.

5. The masked isocyanate of claim 1 wherein the hydroxyl containing compound is a lower molecular weight divalent to hexavalent alcohol.

6. The masked isocyanate of claim 1 wherein the hydroxyl containing compound is a higher molecular weight compound selected from the group consisting of polyesters, polyethers, polyureas, polyurethanes, polyepoxides and polyacrylates.

7. The masked isocyanate of claim 6 wherein the hydroxyl containing compounds have a hydroxyl group content of from 1% to 15% by weight based on the weight of polymer.

8. Reaction products of hydroxyl-containing polymers and the masked isocyanate compounds of claim 1.

9. Cross-linked synthetic resins prepared by heating the masked isocyanate compounds of claim 1 to at least 120° C.

10. The masked isocyanate of claim 1 wherein the organic compound containing at least two hydroxyl groups has a molecular weight below about 1000.

References Cited

UNITED STATES PATENTS

| | | | |
|---|---|---|---|
| 3,518,139 | 6/1970 | Zorell et al. | 260—77.5 TB |
| 3,668,186 | 6/1972 | Duncan et al. | 260—75 NC |
| 3,676,405 | 7/1972 | Labana | 260—77.5 CR |
| 3,692,813 | 9/1972 | Hagemann et al. | 260—77.5 AT |
| 3,432,456 | 3/1969 | Oertel et al. | 260—30.2 |
| 3,475,377 | 10/1969 | Rosendahl | 260—75 |
| 3,522,218 | 7/1970 | Pedain et al. | 260—77.5 |
| 3,640,937 | 2/1972 | Thoma et al. | 260—30.8 |

OTHER REFERENCES

Deutsche Auslegeschrift 1,249,426, Sept. 7, 1967 by Klebert et al. Copy in Class 260, Subclass 77.5 TB.

DONALD E. CZAJA, Primary Examiner

H. S. COCKERAM, Assistant Examiner

U.S. Cl. X.R.

117—93.4 R; 260—31.2, 31.6, 32.6, 32.8, 33.6, 33.8

UNITED STATES PATENT OFFICE
CERTIFICATE OF CORRECTION

Patent No. 3,789,033  Dated January 29, 1974

Inventor(s) Hermann Hagemann et al.

It is certified that error appears in the above-identified patent and that said Letters Patent are hereby corrected as shown below:

Column 1, lines 4 - 10, correct the inventors' addresses by substituting the following -- Hermann Hagemann and Josef Pedain, both of Cologne, Germany, and Erich Zankl deceased, late of Cologne, Germany by Helga Zankl and Walter Zankl, both of Cologne, Germany, and Angelika Zankl de Ramis of Palma de Mallorca, Spain --; same column, line 10, add -- said Hagemann & said Pedain assors. to Bayer Aktiengesellschaft, Leverkusen, Germany --. Column 2, lines 44 and 45, "aroxycarbonylisocy-anate" should read -- aryloxycarbonyl-isocyanate --. Column 3, line 19, "100" should read -- 1000 --.

Signed and Sealed this tenth Day of February 1976

[SEAL]

Attest:

RUTH C. MASON
*Attesting Officer*

C. MARSHALL DANN
*Commissioner of Patents and Trademarks*